(12) United States Patent
Hammer et al.

(10) Patent No.: US 10,738,812 B2
(45) Date of Patent: Aug. 11, 2020

(54) COMPONENT CONNECTION

(71) Applicant: Bayerische Motoren Werke Aktiengesellschaft, Munich (DE)

(72) Inventors: Maik Hammer, Bruckberg (DE); Johann Van Niekerk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 908 days.

(21) Appl. No.: 15/381,822

(22) Filed: Dec. 16, 2016

(65) Prior Publication Data

US 2017/0138381 A1 May 18, 2017

Related U.S. Application Data

(63) Continuation of application No. PCT/EP2015/063145, filed on Jun. 12, 2015.

(30) Foreign Application Priority Data

Jun. 18, 2014 (DE) .................. 10 2014 211 651

(51) Int. Cl.
*F16B 5/08* (2006.01)
*F16B 5/06* (2006.01)
*F16B 5/00* (2006.01)

(52) U.S. Cl.
CPC .......... *F16B 5/0642* (2013.01); *F16B 5/0096* (2013.01); *F16B 5/08* (2013.01)

(58) Field of Classification Search
CPC ........ F16B 5/0642; F16B 5/0664; F16B 5/08; F16B 17/008
See application file for complete search history.

(56) References Cited

U.S. PATENT DOCUMENTS 1,798,738 A * 3/1931 Hoern ............... B21K 1/76
                                                                                                  403/122
2,275,900 A * 3/1942 Hall ............... B23K 11/002
                                                                                                  52/511

(Continued)

FOREIGN PATENT DOCUMENTS

CN       102834626 A     12/2012
DE       34 41 349 A1     5/1986

(Continued)

OTHER PUBLICATIONS

Chinese-language Office Action issued in counterpart Chinese Application No. 201580032346.2 dated Feb. 1, 2018 with English translation (eight (8) pages).

(Continued)

*Primary Examiner* — Daniel J Wiley
(74) *Attorney, Agent, or Firm* — Crowell & Moring LLP

(57) ABSTRACT

A component connection has a first component, a second component with a through hole, and a connecting element, by which the two components are connected to each other. The connecting element has at least two balls connected to each other, of which a first ball extends, at least over part of the diameter thereof, through the through-hole. A second ball of the connecting element is pressed into the material of the first component such that the second ball is connected to the first component in a positive-locking manner.

18 Claims, 2 Drawing Sheets

(56) References Cited

U.S. PATENT DOCUMENTS

| | | | | |
|---|---|---|---|---|
| 4,070,120 | A | * | 1/1978 | Bald ................... B23Q 16/08 403/13 |
| 4,637,116 | A | | 1/1987 | Paerisch et al. |
| 4,752,026 | A | * | 6/1988 | Van De Griend ... B23K 11/004 228/120 |
| 5,113,054 | A | * | 5/1992 | Hund ................... B23K 11/006 219/117.1 |
| 5,401,911 | A | * | 3/1995 | Anderson ............ H05K 3/4046 100/295 |
| 5,969,418 | A | * | 10/1999 | Belanger, Jr. ....... H01L 23/4985 228/180.22 |
| 9,631,655 | B2 | * | 4/2017 | Van Niekerk ........... F16B 21/07 |
| 2006/0000959 | A1 | | 1/2006 | Hansen |
| 2013/0036594 | A1 | | 2/2013 | Hammer et al. |
| 2013/0269873 | A1 | | 10/2013 | Herzinger et al. |
| 2014/0143989 | A1 | | 5/2014 | Herzinger et al. |
| 2014/0294488 | A1 | | 10/2014 | Van Niekerk et al. |
| 2015/0033532 | A1 | | 2/2015 | Van Niekerk et al. |
| 2016/0265567 | A1 | | 9/2016 | Van Niekerk et al. |

FOREIGN PATENT DOCUMENTS

| | | |
|---|---|---|
| DE | 10 2010 063 717 A1 | 6/2012 |
| DE | 10 2011 087 282 A1 | 2/2013 |
| DE | 10 2011 087 286 A1 | 2/2013 |
| DE | 10 2012 206 938 B3 | 2/2013 |
| DE | 10 2012 212 101 B3 | 7/2013 |
| DE | 10 2012 203 217 A1 | 9/2013 |
| EP | 2 698 549 A1 | 2/2014 |
| WO | WO 2015/104124 A1 | 7/2015 |

OTHER PUBLICATIONS

International Search Report (PCT/ISA/210) issued in PCT Application No. PCT/EP2015/063145 dated Aug. 18, 2015 with English-language translation (four (4) pages).

German-language Written Opinion (PCT/ISA/237) issued in PCT Application No. PCT/EP2015/063145 dated Aug. 18, 2015 (five (5) pages).

German Office Action issued in counterpart German Application No. 10 2014 211 651.1 dated Apr. 30, 2015 (six (6) pages).

* cited by examiner

COMPONENT CONNECTION

CROSS REFERENCE TO RELATED APPLICATIONS

This application is a continuation of PCT International Application No. PCT/EP2015/063145, filed Jun. 12, 2015, which claims priority under 35 U.S.C. § 119 from German Patent Application No. 10 2014 211 651.1, filed Jun. 18, 2014, the entire disclosures of which are herein expressly incorporated by reference.

BACKGROUND AND SUMMARY OF THE INVENTION

The present invention relates to a component connection having a first component, a second component with a through-hole and a connecting element by which the first and second components are connected to one another.

Such a component connection is known, for example, from DE 10 2012 206 938 B3.

A large number of individual bodywork components and fitted components, such as, for example, mounts, etc., are substantially automatically assembled during large-batch production of vehicle bodyworks. During a joining operation, two or more bodywork components are first positioned relative to each other by means of complex clamping and receiving techniques and are subsequently connected to each other, for example, by welding, clinching or other joining methods.

An object of the invention is to provide a component connection by means of which two components can be connected to each other in a simple, assembly-friendly and cost-effective manner.

This and other objects are achieved by a component connection having a first component, a second component which has a through-hole, and a connection element, by which the two components are connected to each other. The connection element has at least two balls or spherical or ball-shaped elements which are connected to each other and of which a first ball or a first spherical or ball-shaped element extends over at least a portion of the diameter thereof through the through-hole. A second ball or a second spherical or ball-shaped element of the connection element is pressed into the material of the first component in such a manner that the second ball or the second spherical or ball-shaped element is connected to the first component in a positive-locking manner.

The starting point of the invention is a component connection having a first component and a second component which has a through-hole. The first component may be a metal component, in particular a steel or aluminum component. The first component may be, for example, a metal sheet, in particular a bodywork panel of a vehicle.

The second component may also be a metal component, for example, a steel or aluminum component and may be, for example, in the form of a metal sheet, in particular a bodywork panel.

Alternatively, one of the two components may also be a fitted component of a vehicle bodywork.

The two components may be made of one and the same material or of different materials. For example, there may be provision for the first or second component or the first and second component to comprise a plastics material, in particular fiber-reinforced (for example, glass-fiber and/or carbon-fiber-reinforced) plastics material.

In order to connect the two components, there is provided a connection element which has at least two balls or spherical or ball-shaped elements which are connected to each other. The at least two balls or spherical or ball-shaped elements can be connected to each other directly, for example, by welding. Alternatively, they can also be produced integrally, that is to say, connected to each other in a materially integral manner. As used herein, the term "ball" encompasses spherical or ball-shaped elements.

A first ball or a first spherical or ball-shaped element of the connection through-element extends at least over a portion of the height or diameter thereof through the hole which is provided in the second component.

Unlike the publication DE102012206938 B3 mentioned above, the present invention is distinguished, inter alia, in that a second ball or a second spherical or ball-shaped element of the connection element is pressed into the material of the first component and, consequently, into the first component in such a manner that the second ball or the second spherical or ball-shaped element is connected to the first component in a positive-locking manner. The second ball or the second spherical or ball-shaped element does not have to be pressed into the first component in its entirety but may instead also be pressed in only partially, that is to say, a non-pressed-in portion of the second ball or the second spherical or ball-shaped element may project out of the first component after the pressing operation.

When the second ball or the second spherical or ball-shaped element is pressed into the first component, there is produced a flow of the material of the first component and/or the material of the second ball or the second spherical or ball-shaped element in such a manner that the above-mentioned positive-locking connection is produced between the second ball or the second spherical or ball-shaped element and the first component. The term "pressing in" is therefore intended to be understood to mean that material of the first component and/or the second ball or the second spherical or ball-shaped element flows and not, for instance, that the second ball is clamped in a recess of the first component.

According to a development of the invention, there is provision for the material of the second ball or the second spherical or ball-shaped element or the material of the entire connection element to be harder than, or at least as hard as, the material of the first component.

Tests have established that a connection element according to the invention can be pressed into a first component in such a manner that material of the first component flows in such a manner that it at least partially engages in a positive-locking manner around the second ball or the second spherical or ball-shaped element of the connection element, similarly to the case of an articulation socket of a ball and socket joint.

Preferably, the second ball or the second spherical or ball-shaped element is pressed into the first component so that material of the first component extends as far as a location in a region above the equatorial plane of the second ball or the second spherical or ball-shaped element and fits closely against the second ball or the second spherical or ball-shaped element in a closely adjoining manner. Preferably, material of the first component fits closely over an entire periphery of the second ball or the second spherical or ball-shaped element against the second ball or the second spherical or ball-shaped element.

In this manner, a positive-locking and substantially non-releasable connection can be achieved between the second ball or the second spherical or ball-shaped element and the first component.

According to a development of the invention, the second ball or the second spherical or ball-shaped element is pressed into the first component in such a manner that it does not extend through the first component. There may be provision for the first component to be arched in the region of the second ball or the second spherical or ball-shaped element at the side facing away from the second component.

Tests have established that, by the second ball or the second spherical or ball-shaped element of the connection element being pressed in, not only a high-strength but also a qualitatively high-grade, crack-free connection can be achieved between the second ball or the second spherical or ball-shaped element and the first component, which connection can be compared with a reprocessed weld connection which is produced in a qualitatively high-grade manner in terms of the production quality thereof.

According to a development of the invention, there is provision for an edge or an edge portion of the through-hole to adjoin the first ball or the first spherical or ball-shaped element in a clamping manner and/or in a positive-locking manner from the outer side. The edge of the through-hole or an edge portion of the through-hole may be bent over or up in a collar-shaped manner in a direction which is directed away from the first component. There may be provision for the bent-over or bent-up edge to adjoin the first ball or the first spherical or ball-shaped element of the connection element resiliently from the outer side.

There may be further provision for the edge or an edge portion of the through-hole to adjoin the first ball or the first spherical or ball-shaped element below an equatorial plane of the first ball or the first spherical or ball-shaped element and, consequently, to oppose in a positive-locking manner a removal of the second component from the connection element or the first component.

Instead of a peripheral collar-shaped edge portion of the through-hole, a plurality of clamping-collar-shaped elements which are spaced apart from each other in a peripheral direction may also be provided over the periphery of the through-hole.

There may be provision for the second ball or the second spherical or ball-shaped element to be connected to the first component only by being pressed into the first component. Therefore, the second ball or the second spherical or ball-shaped element does not need to be welded to the first component in addition.

According to a development of the invention, there is provision for the connection element, in particular the second ball or the second spherical or ball-shaped element, to be made of metal, for example, steel or aluminum.

The connection element may be constructed as a "double ball", that is to say, there may be provision for the connection element to comprise precisely two balls or spherical or ball-shaped elements which are connected to each other. As already mentioned, the balls or spherical or ball-shaped elements of the connection element can be connected to each other directly, that is to say, can be arranged in a row in the manner of a pearl necklace. The individual balls or spherical or ball-shaped elements of the connection element can be welded to each other or connected to each other in some other manner.

Other objects, advantages and novel features of the present invention will become apparent from the following detailed description of one or more preferred embodiments when considered in conjunction with the accompanying drawing.

DETAILED DESCRIPTION OF THE DRAWING

Figure 1:
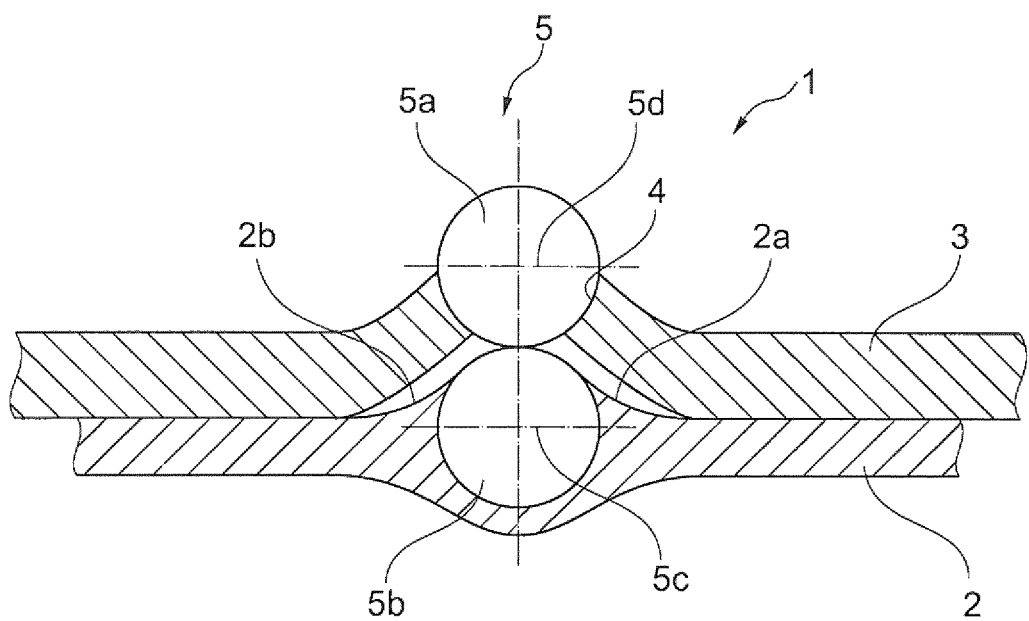
FIG. 1 is a schematic illustration exemplifying the basic principle of the invention.
Figure 2:
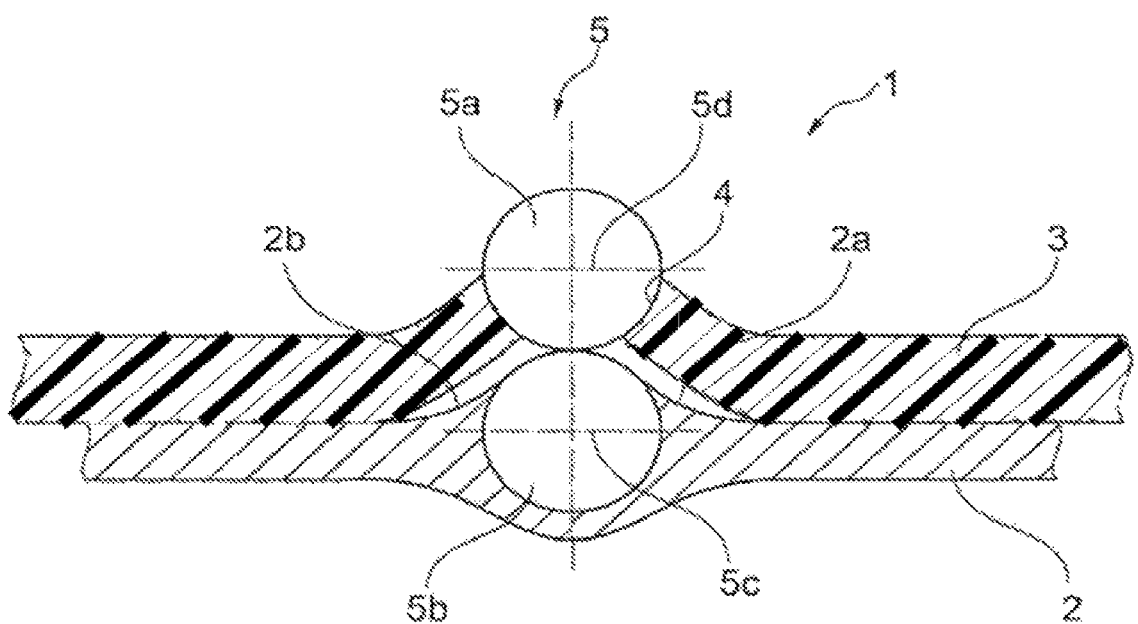
FIG. 2 is a schematic illustration exemplifying the basic principle of the invention, wherein the second component is made of a plastics material.

FIG. 1 shows a component connection 1 having a first component 2 which is in this instance a metal sheet component, for example, a steel sheet component, such as, for example, a bodywork component of a vehicle. The component connection 1 further has a second component 3 in which a through-hole 4 is provided. The second component 3 may also be a metal sheet component.

In this instance, the two components 2, 3 are connected to each other by a connection element 5 in the form of a "double ball". The connection element 5 has in this case two balls 5a, 5b which are connected to each other. At least a portion of the diameter of the first ball 5a extends through the through-hole 4 provided in the second component 3. The second ball 5b of the connection element 5 is pressed into the material of the first component 2. As a result of the pressing-in action, material of the first component 2 flows so that it closely adjoins the ball 5b in a positive-locking manner in the pressed-in state.

As can be seen in FIG. 1, the first component 2 is arched downward in the region of the second ball 5b, that is to say, in the direction of the side facing away from the second component 3. The arching has been produced by the ball 5b being pressed-in. In the embodiment shown here, the second ball 5b has been pressed into the first component only to an extent that it does not extend through the first component 2.

As can be seen in FIG. 1, the second ball 5b is pressed into the first component 2 in such a manner that material 2a, 2b of the first component extends as far as a location in the region above an equatorial plane 5c of the second ball 5b and closely fits against the second ball 5b in a closely adjoining manner at that location.

As can be seen in FIG. 1, an edge region of the through-hole 4 of the second component 3 is bent over or upward in a direction which is directed away from the first component 2. The edge region of the through-hole 4 may be constructed as a peripheral clamping collar. Alternatively, there may also be provided over the periphery of the through-hole 4 a plurality of clamping-collar-shaped elements which are bent over or up and which are spaced apart from each other in a peripheral direction and which adjoin the first ball 5a resiliently from the outer side and obliquely from below.

As can be seen in FIG. 1, the bent-over or bent-up edge of the through-hole 4 adjoins the first ball 5a obliquely from below under an equatorial plane 5d of the first ball. There is thereby produced an "undercut" or a positive-locking connection and a frictionally engaging connection which opposes a removal of the second component 3 from the connection element 5 or from the first component 2 in a positive-locking and/or frictionally engaging manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component connection, comprising:
   a first component;
   a second component having a through-hole;
   a connection element by which the first and second components are connected to one another, wherein
   the connection element comprises at least two balls connected to one another, at least a portion of a diameter of the first ball extending through the through-hole of the second component, and
   a second ball of the two balls, pressed into material of the first component, form a positive-locking connection between the second ball and the first component.

2. The component connection as claimed in claim 1, wherein an edge of the through-hole adjoins the first ball in a clamping and/or positive-locking manner from an outer side of the first ball.

3. The component connection as claimed in claim 2, wherein the edge of the through-hole adjoins the first ball below an equatorial plane of the first ball and opposes in a positive-locking and/or frictionally-engaging manner a removal of the second component from the connection element or the first component.

4. The component connection as claimed in claim 1, wherein the second ball is connected to the first component only via the positive-locking connection formed by pressing the second ball into material of the first component.

5. The component connection as claimed in claim 4, wherein the second ball does not extend through the first component.

6. The component connection as claimed in claim 1, wherein the second ball of the connection element is made of a metal.

7. The component connection as claimed in claim 1, wherein the connection element comprises only two balls that are connected to one another.

8. The component connection as claimed in claim 1, wherein the at least two balls are welded to each other.

9. The component connection as claimed in claim 1, wherein
   the through-hole of the second component has an edge that is bent-over or up in a direction away from the first component, and
   the edge adjoins the first ball resiliently from an outer side of the first ball.

10. The component connection as claimed in claim 1, wherein the first component is made from a metal.

11. The component connection as claimed in claim 1, wherein the second component is made from a metal.

12. The component connection as claimed in claim 1, wherein the second component is made of a plastics material.

13. The component connection as claimed in claim 1, wherein the second component is made of a fiber-reinforced plastics material.

14. The component connection as claimed in claim 1, wherein the first component is arched in a region of the second ball at a side that faces away from the second component.

15. The component connection as claimed in claim 1, wherein
   the material of the first component extends as far as a location in a region above an equatorial plane of the second ball, and
   the material of the first component closely fits against the second ball in an adjoining manner.

16. The component connection as claimed in claim 1, wherein the second ball is made of steel.

17. The component connection as claimed in claim 1, wherein the first component is made of steel or aluminum.

18. The component connection as claimed in claim 1, wherein the second component is made of steel or aluminum.

* * * * *